United States Patent [19]

Allen

[11] 4,379,228

[45] Apr. 5, 1983

[54] NEUTRON-NEUTRON-LOGGING

[75] Inventor: Linus S. Allen, Dallas, Tex.

[73] Assignee: Mobil Oil Corporation, New York, N.Y.

[21] Appl. No.: 196,001

[22] Filed: Oct. 10, 1980

[51] Int. Cl.³ .............................................. G01V 5/00
[52] U.S. Cl. .................................... 250/266; 250/269
[58] Field of Search ............... 250/256, 264, 265, 269, 250/266; 376/159, 160

[56] References Cited

U.S. PATENT DOCUMENTS

| | | | |
|---|---|---|---|
| 3,413,472 | 11/1968 | Caldwell | 250/83.3 |
| 3,420,998 | 1/1969 | Mills, Jr. | 250/83.3 |
| 3,491,238 | 1/1970 | Allen | 250/83.1 |
| 4,005,290 | 1/1977 | Allen | 250/266 |

Primary Examiner—Alfred E. Smith
Assistant Examiner—Janice A. Howell
Attorney, Agent, or Firm—Charles A. Huggett; Michael G. Gilman; George W. Hager

[57] ABSTRACT

A borehole logging tool includes a steady-state source of fast neutrons and three thermal neutron flux detectors. First and second detectors measure the same thermal neutron flux parameter and the third detector measures a different thermal neutron flux measurement. A count rate meter is connected to each thermal neutron flux detector. A first ratio detector provides the ratio of the outputs of the two count rate meters conncted to the first and second detectors measuring the same thermal neutron flux parameter. A second ratio detector provides the ratio of the outputs of the two count rate meters connected to the third detector and one of the first or second detectors. By comparing the signals of the two ratio detectors, oil bearing zones and salt water bearing zones within the formation being logged can be distinguished and porosity can be determined.

9 Claims, 2 Drawing Figures

NEUTRON-NEUTRON-LOGGING

BACKGROUND OF THE INVENTION

This invention relates to radioactive well logging and more particularly to an improved method of and system for distinguishing between oil bearing zones and salt water bearing zones in subsurface formations surrounding a borehole and for further use in determining the porosity of the formation.

In neutron-neutron logging, a steady-state source of primary radiation irradiates the formations surrounding the borehole with neutrons. The resulting secondary radiation can be measured by thermal neutron flux detectors axially spaced from such source within the borehole. The resulting secondary radiation includes generally the effect of both epithermal and thermal neutron parameters.

The epithermal neutron slowing-down length of the formation is determined primarily by the concentration of hydrogen in the formation and is affected only slightly by the formation's neutron absorption properties. Consequently, the type of fluid in the rock's pore space has little or no effect on the number of epithermal neutrons returning to the borehole as secondary radiation.

The thermal neutron diffusion length of the formation, on the other hand, is affected by the presence of oil or salt water and is significantly reduced when the pore spaces of the formation contain salt water rather than oil. The chlorine present in the salt water has a large capture cross section for thermal neutrons and, consequently, reduces the number of thermal neutrons returning to the borehole as secondary radiation. At the same time, the capture of thermal neutrons by the chlorine effects an increase in the number of thermal neutron capture gamma rays returning to the borehole as secondary radiation.

In U.S. Pat. No. 4,005,290 to Allen, there is described a neutron-neutron logging system for distinguishing between oil bearing zones and salt water bearing zones in subsurface formations surrounding a borehole and for further use in determining oil saturation of an identified oil bearing zone. In such system, a steady-state source of primary radiation is located within a borehole for irradiating the formations surrounding the borehole with fast neutrons. A first pair of radiation detectors located at spaced-apart positions from the source within the borehole measures that secondary radiation affected predominantly by the epithermal neutron parameters of the formation. A second pair of radiation detectors located at spaced-apart positions from the source within the borehole measures that secondary radiation affected by both the epithermal and the thermal neutron parameters of the formation.

The first pair of detectors measures the intensity of epithermal neutrons returning to the borehole from the formation. The second pair of detectors may measure the intensity of either thermal neutrons or thermal neutron capture gamma rays returning to the borehole from the formation. A ratio is taken of the measurements from the first pair of detectors as an indication of the formation porosity. A ratio is taken of the measurements from the second pair of detectors as an indication of both porosity and macroscopic absorption cross section of the formation. An increase in the differential between these two ratios at any given depth indicates a change from an oil bearing zone to a salt water bearing zone in the formation at that depth, while a decrease in this differential indicates a change from a salt water bearing zone to an oil bearing zone. The differential between the two determined ratios is corrected by known factors for the macroscopic absorption cross sections of rock, oil, and water in the formation to give an indication of the amount of oil saturation in an identified oil bearing zone.

SUMMARY OF THE INVENTION

In accordance with the present invention a steady-state source of primary radiation is located within a borehole for irradiating the formation surrounding the borehole with fast neutrons. First and second radiation detectors are located within the borehole tool at spaced-apart positions from the source. Such first and second detectors measure the same type of radiation: thermal neutrons, epithermal neutrons or gamma rays. A third radiation detector is located within the borehole tool at the same distance from the neutron source within the tool as one of the first or second detectors. Such third detector measures a different type of radiation than that measured by the first and second detectors.

A signal is produced representative of the ratio of the radiation intensities measured by the first and second detectors. Another signal is produced representative of the ratio of the radiation intensitites measured by the third detector and one of the first or second detectors located at the same position within the borehole tool as the third detector. The difference between these two signals is utilized to distinguish between oil bearing zones and salt water bearing zones of the formation being logged. In a further aspect, this difference is used to modify the ratio of the thermal neutron flux measurements of the first and second detectors so as to provide a porosity correction for salt water formations.

DESCRIPTION OF THE PREFERRED EMBODIMENT

The present invention is directed toward a method and system of neutron-neutron logging for distinguishing oil bearing zones from salt water bearing zones in a subsurface formation and for determining formation porosity.

Figure 1:
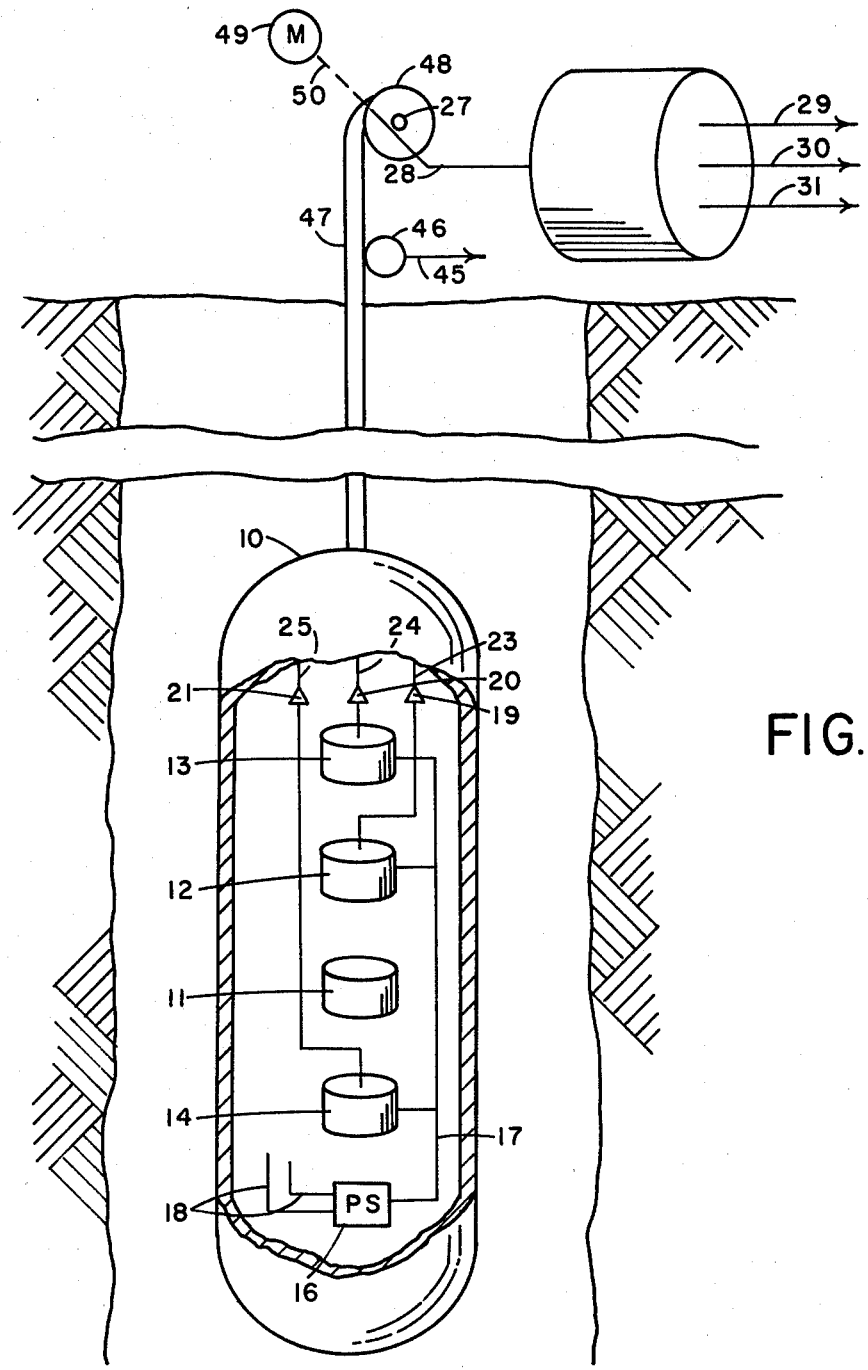
FIG. 1 illustrates a borehole logging tool for carrying out the present invention.

Referring to FIG. 1, a borehole logging tool 10 has a steady-state neutron source 11 for irradiating the formations surrounding a borehole. Neutron source 11 preferably is a steady-state Am-Be fast neutron source with an average energy of about 4 million electron volts. Two similar thermal neutron flux detectors 12 and 13 are spaced-apart from the neutron source 11. A third detector 14 dissimilar from detectors 12 and 13, is spaced at the same distance from the neutron source 11 as one of the two detectors 12 and 13. Although the embodiment in FIG. 1 illustrates detector 14 as being spaced at the same distance from the neutron source 11 as is detector 12, it may, if desired, be spaced further from the neutron source at the same distance as detector 13. Detector 14 may be axially located either on the same side of the logging tool from neutron source 11 as detectors 12 and 13 or on the opposite side as illustrated in FIG. 1. A power supply 16 is located within the borehole tool 10 for supplying power to the detectors 12-14 by way of conductor 17. Current is applied to the power supply from the surface by way of conductors 18. The outputs of the detectors 12-14 are applied to amplifiers 19-21 which in turn are coupled to conductors 23-25 included in cable 47. At the surface, the outputs from conductors 23-25 are applied by way of the slip rings 27 and brushes 28 to conductors 29-31 which extend to amplifiers 33-35 of FIG. 2.

In carrying out the invention, detectors 12 and 13 are spaced at a relatively great distance from the source 11 in order to increase sensitivity to the porosity properties of the formation. The spacing or distance between the source and detectors, or source-to-detector spacings, as employed in describing the present invention, refers to the distance between the center of the source and the center of the detectors. It has been found that at certain large source-to-detector spacings the thermal neutron flux detected will be characterized by an epithermal neutron parameter, the slowing down length, which is greater than the thermal neutron parameter, the thermal neutron diffusion length and is, therefore, a measure of formation porosity.

Figure 2:
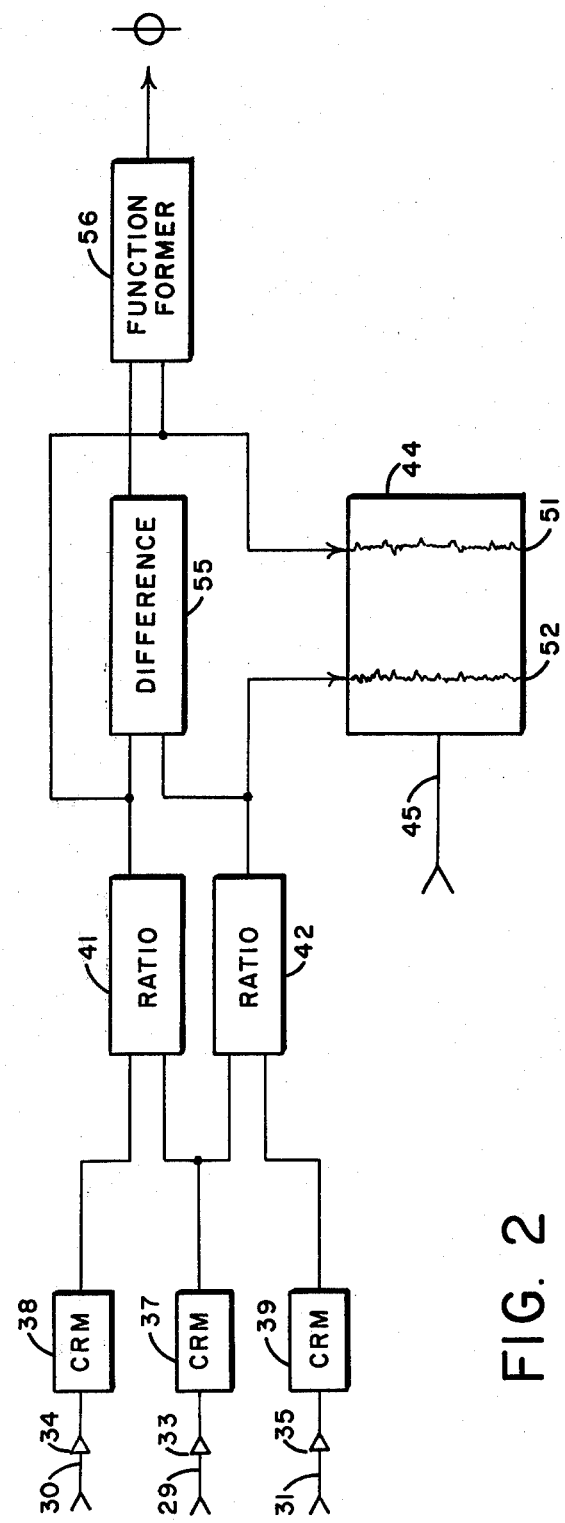
FIG. 2 illustrates an uphole recording system for use in conjunction with the borehole logging tool of FIG. 1.

As previously noted, detectors 12 and 13 are similar, that is, both are either epithermal detectors, thermal detectors, or gamma-ray detectors. By taking the ratio of the radiation detected by each of the similar detectors 12 and 13 essentially all dependence of the measured ratio upon thermal neutron parameters can be eliminated or significantly reduced. In FIG. 2, this ratio is obtained by applying the outputs of detectors 12 and 13 through amplifiers 33 and 34 to count rate meters 37 and 38 respectively. Each count rate meter is coupled to the ratio detector 41. Recorder 44, coupled to the output of ratio detector 41, records trace 51 representative of the epithermal parameter, the slowing down length, and hence of formation porosity obtained with the two spaced-apart, similar detectors 12 and 13.

To determine water or oil saturation in a formation, the ratio of the epithermal neutron flux to the thermal neutron flux is measured at a given point in the borehole.

Referring again to FIG. 1, detector 14 is axially located at the same distance from the neutron source 11 as detector 12. Detector 14 is dissimilar from the detector 12, that is, if detector 12 is an epithermal neutron detector, then detector 14 is either a thermal neutron detector or a gamma-ray detector. Finally, if detector 12 is a gamma-ray detector, then detector 14 is either an epithermal neutron detector or a thermal neutron detector. Consequently if detector 12 is measuring epithermal neutron flux, detector 14 is measuring thermal neutron flux. Alternatively, if detector 12 measures thermal neutron flux, then detector 14 measures epithermal neutron flux. The benefit of measuring the epithermal-to-thermal neutron flux ratio can be seen by considering the diffusion theory solutions for a point source of fast neutrons in an infinite, homogeneous medium.

The expression for the thermal neutron flux at any point to distance from the source is:

$$\phi_t(r) = \frac{Q}{4\pi D_t} \cdot \frac{L_t^2}{L_e^2 - L_t^2} \left( \frac{e^{-r/L_e}}{r} - \frac{e^{-r/L_t}}{r} \right).$$

The equation for the epithermal neutron flux is:

$$\phi_e(r) = \frac{Q}{4\pi D_e} \cdot \frac{e^{-r/L_e}}{r}$$

By taking the ratio:
$\phi_t(r)/\phi_e(r)$
We get:

$$\frac{\phi_t(r)}{\phi_e(r)} = \frac{D_e}{D_t} \cdot \frac{L_t^2}{L_e^2 - L_t^2} (1 - e^{-r(1/L_t - 1/L_e)})$$

By using the parameters given in the aforementioned patent for sandstone formations, it is easy to show that the exponential function is much less than unity for spacings r which are 20 cm or greater. For such spacings we thus get:

$$\frac{\phi_t(r)}{\phi_e(r)} \simeq \frac{D_e}{D_t} \cdot \frac{L_t^2}{L_e^2 - L_t^2}$$

which is independent of r.
In the foregoing:
$\phi_t$ is the thermal neutron flux,
$\phi_e$ is the epithermal neutron flux,
r is the radical distance measured from the source,
Q is the point neutron source strength in neutrons/second,
$D_e$ is the epithermal neutron diffusion coefficient,
$D_t$ is the thermal neutron diffusion coefficient,
$L_e$ is the epithermal neutron parameter (slowing down length), and
$L_t$ is the thermal neutron parameter (diffusion length).

To estimate the sensitivity of the thermal to epithermal flux ratio to changes from fresh water or oil in a 10% NaCl brine in the pore space of sandstone formations, we use the previously mentioned parameters to obtain the following results:

A. 11% Porosity Sandstone $$(\phi_t/\phi_e)\text{oil} = (85.4/0.742)[10.7^2/(13.7^2 - 10.7^2)] = 180$$

$$(\phi_t/\phi_e)\text{s.w.} = (85.4/0.750)[8.5^2/(13.7^2 - 8.5^2)] = 71.3$$

B. 23% Porosity Sandstone $$(\phi_t/\phi_e)\text{oil} = (80.4/0.514)[7.7^2/(11.5^2 - 7.7^2)] = 127$$

$$(\phi_t/\phi_e)\text{s.w.} = (80.4/0.523)5.6^2/(11.5^2 - 5.6^2)] = 47.8$$

C. 34% Porosity Sandstone $$(\phi_t/\phi_e)\text{oil} = (77.0/0.393)[6.2^2/(10.5 - 6.2^2)] = 105$$

$$(\phi_t/\phi_e)\text{s.w.} = (77.0/0.401)[4.2^2/(10.5^2 - 4.2^2)] = 36.6$$

Here the subscript "oil" refers to either oil or fresh water; the subscript "s.w." refers to a 10% NaCl brine. Clearly, the ratio $\phi_t/\phi_e$ changes greatly when oil rather than salt water fills the pore space.

In FIG. 2 this ratio is determined by applying the outputs of detectors 12 and 14 through amplifiers 33 and 35 to count rate meters 37 and 39 respectively. Each count rate meter is coupled to the ratio detector 42. Recorder 44, coupled to the output of ratio detector 42 records trace 52 representative of the ratio of the epithermal neutron flux to the thermal neutron flux and, hence, of the water or oil saturation of the formation.

The trace 51 produced from the ratio of the two similar detectors 12 and 13 will deviate from trace 52 produced from the ratio of the two dissimilar detectors 12 and 14. Such deviation will be proportional to the water or oil saturation of the formation.

Hence, by recording the outputs of the ratio detectors 41 and 42 as continuous traces 51 and 52, respectively, a log is provided on which one can readily observe changes in the differential between the magnitudes of the signals from the detectors 12–14 and thereby distinguish oil bearing zones from salt water bearing zones within the formations surrounding the borehole since the magnitude of such differential is much larger for a salt water bearing zone than for an oil bearing zone.

The ratio from detector 41 can be calibrated in terms of formation porosity. Such a porosity calibration is particularly desirable for formations containing salt water. The calibration can be obtained by modifying the ratio in terms of porosity, with a suitable proportion of the difference between the two measured ratios. Hence, the separation between the two ratios, as illustrated in traces 51 and 52 can be used not only to determine oil saturation but also to correct the ratio determined by detector 41 so that an accurate measurement of porosity can be obtained.

Such calibration for porosity is accomplished by means of the difference determining means 55 and porosity function former means 56. The difference determining means 55 preferably includes at least one operational amplifier to which are applied the signals from ratio detectors 41 and 42. Feedback and biasing resistors are selected for calibrating the output signal from the operational amplifier. The output of the difference determining means 55 is the difference between the two counting ratios. Such difference is applied to the function former means 56 where a portion of such difference modifies the counting rate ratio. The porosity function former 56 is preferably at least one operational amplifier calibrated with feedback and biasing resistors to select that portion of the difference in the counting ratios required to provide the desired porosity indication such portion being identified by running the borehole tool in a calibration mode.

It is to be understood that various modifications to the disclosed embodiment, as well as alternative embodiments, may become apparent to one skilled in the art without departing from the scope and spirit of the invention as hereinafter defined by the appended claims.

What is claimed is:

1. A system for logging the formations traversed by a borehole, comprising:

(a) a borehole tool,
(b) means for moving said borehole tool through a borehole,
(c) a steady-state source of fast neutrons located within said borehole tool for irradiating the formations surrounding the borehole with neutrons,
(d) first and second radiation detectors located within said borehole tool at spaced-apart positions from said source, said first and second detectors measuring the same type of radiation
(e) a third radiation detector located within said borehole tool and spaced at the same distance from the fast neutron source as one of said first or second detectors, said third detector measuring a different type of radiation than that measured by said first and second detectors,
(f) means for producing a signal representative of the ratio of the radiations measured by said first and second detectors, and
(g) means for producing a second signals representative of the ratio of the radiations measured by said third detector and the one of said first or second detectors spaced at the same distance from that fast neutron source within the borehole tool as said third detector.

2. The system of claim 1 further including means for producing a differential signal representative of the difference between said ratio signals to distinguish between oil bearing zones and salt water bearing zones of the formation being logged.

3. The system of claim 2 further including means for modifying the ratio of the radiations measured by said first and second detectors with a selected portion of said differential signal to provide a porosity correction for salt water formations.

4. The system of claim 1 wherein said first and second detectors measure epithermal neutrons and said third detector measures thermal neutrons.

5. The system of claim 1 wherein said first and second detectors measure epithermal neutrons and said third detector measures gamma-rays.

6. The system of claim 1 wherein said first and second detectors measure thermal neutrons and said third detector measures epithermal neutrons.

7. The system of claim 1 wherein said first and second detectors measure thermal neutrons and said third detector measures gamma-rays.

8. The system of claim 1 wherein said first and second detectors measure gamma-rays and said third detector measures epithermal neutrons.

9. The system of claim 1 wherein said first and second detectors measure gamma-rays and said third detector measures thermal neutrons.

* * * * *